(12) United States Patent
Hodgson et al.

(10) Patent No.: US 7,212,654 B2
(45) Date of Patent: May 1, 2007

(54) MEASUREMENT OF FRUIT PARTICLES

(75) Inventors: Allan S. Hodgson, Saint Anne, IL (US); Jessica M. Arnold, West Lafayette, IN (US)

(73) Assignee: Dawn Foods, Inc., Jackson, MI (US)

( * ) Notice: Subject to any disclaimer, the term of this patent is extended or adjusted under 35 U.S.C. 154(b) by 678 days.

(21) Appl. No.: 08/879,322

(22) Filed: Jun. 20, 1997

(65) Prior Publication Data

US 2001/0012380 A1    Aug. 9, 2001

(51) Int. Cl.
*G06K 9/00*    (2006.01)
(52) U.S. Cl. .......................... 382/110; 348/89
(58) Field of Classification Search ................ 382/110; 209/556, 558, 577, 586, 587; 348/89, 91; 99/392, 467, 471, 495, 509
See application file for complete search history.

(56) References Cited

U.S. PATENT DOCUMENTS

| | | | | |
|---|---|---|---|---|
| 3,575,287 A | * | 4/1971 | Graveley | 206/204 |
| 4,324,335 A | | 4/1982 | Conway et al. | 209/586 |
| 4,515,275 A | * | 5/1985 | Mills et al. | 209/558 |
| 4,687,107 A | | 8/1987 | Brown et al. | 209/556 |
| 4,692,024 A | * | 9/1987 | Bloss | 356/135 |
| 4,702,535 A | * | 10/1987 | Beun | 312/308 |
| 4,735,323 A | | 4/1988 | Okada et al. | 209/582 |
| 4,818,380 A | | 4/1989 | Azegami et al. | 209/565 |
| 4,844,937 A | * | 7/1989 | Wilkinson et al. | 426/449 |
| 4,875,254 A | * | 10/1989 | Rudy et al. | 452/157 |
| 4,940,536 A | | 7/1990 | Cowlin et al. | 209/592 |
| 4,975,863 A | * | 12/1990 | Sistler et al. | 382/110 |
| 5,060,290 A | | 10/1991 | Kelly et al. | 382/110 |
| 5,095,204 A | * | 3/1992 | Novini | 250/223 B |
| 5,212,637 A | * | 5/1993 | Saxena | 600/407 |
| 5,301,090 A | * | 4/1994 | Hed | 362/558 |
| 5,344,046 A | * | 9/1994 | Maldanis et al. | 221/98 |
| 5,409,119 A | | 4/1995 | Rao Datari | 209/580 |
| 5,435,641 A | * | 7/1995 | Dumon Dupuis et al. | 312/223.1 |
| 5,533,628 A | * | 7/1996 | Tao | 209/580 |
| 5,546,475 A | * | 8/1996 | Bolle et al. | 382/190 |
| 5,574,251 A | * | 11/1996 | Sevier | 174/50 |
| 5,659,624 A | * | 8/1997 | Fazzari et al. | 382/110 |
| 5,659,819 A | * | 8/1997 | LeCover | 396/164 |
| 5,732,147 A | * | 3/1998 | Tao | 382/110 |
| 5,761,070 A | * | 6/1998 | Conners et al. | 382/165 |
| 5,818,953 A | * | 10/1998 | Queisser et al. | 382/110 |
| 5,845,002 A | * | 12/1998 | Heck et al. | 382/110 |

FOREIGN PATENT DOCUMENTS

JP    2279875    12/1987

\* cited by examiner

*Primary Examiner*—Samir Ahmed
(74) *Attorney, Agent, or Firm*—Young & Basile, P.C.

(57) ABSTRACT

Apparatus and methods to characterize and measure fruit pieces in food products are provided. A sample is spread on a viewing cell and illuminated. The image is captured by a camera and fed to a computer with imaging software. Information useful for quality control purposes and process control is obtained.

19 Claims, 3 Drawing Sheets

MEASUREMENT OF FRUIT PARTICLES

FIELD OF THE INVENTION

The present invention concerns methods and apparatus for the measurement of fruit particles for a food product.

BACKGROUND OF THE INVENTION

The production of food products such as fruit fillings and toppings for use in, for example, yogurt and baked goods involves the cooking of fruit pieces with a variety of ingredients to produce a product with fruit pieces in a matrix of sugar, starch and/or other materials. The fruit pieces used may be fresh, frozen or cooked. Typically, the fruit and other materials in the recipe are cooked at temperatures up to 190° F. while agitated in a jacketed kettle. Quantities up to 300 gallons are not uncommon. The processed fruit product is cooled and packaged and may pass through piping and pumps before entering the final package.

The appearance and size of the fruit pieces is an important attribute for customer acceptance in many instances. The processing of the fruit generally degrades the physical appearance of the fruit pieces.

One current test for fruit identity in cooked food products containing fruit particles such as those used in yogurt is a "Fruit Retention Test". The food product is washed on a screen to remove the matrix. The fruit retained on the screen is weighed and reported as a percentage fruit retention. The intention of the test is to measure the amount of complete fruit pieces above selected size and maintain a fruit identity based on this test. However, the "Fruit Retention Test" has been shown to have wide variability and it is difficult to obtain consistent results.

Computer imaging is believed to have many advantages for use in the measurement of fruit particles in a matrix. The use of computers to analyze images from a camera has developed rapidly in the last few years as increased speed and memory has permitted detailed examination of large numbers of images at a high rate. The technology has been driven by the need for high speed 100% inspection systems for applications outside the food industry and has been used as a method for quality inspection in such applications as contact lenses, semiconductor wafers, electronics, pharmaceuticals and others. The camera image is analyzed by the computer software and then measured against preselected criteria. The images can be examined by particle size, shape and area using pattern recognition and blob analysis to produce statistical data, particle size distribution tables, aspect ratios, graphs and for other methods of data presentation. It is proposed that such systems could be used for fresh fruit, frozen fruit and cooked fruit pieces containing food products.

It is, therefore, an object of the present invention to provide a simple and quick method of analyzing fruit particles for food products.

Another object is to provide economical and easy to construct apparatus for the analysis of fruit particles for food products.

Other objects and advantages of the present invention will become apparent as the description proceeds.

SUMMARY OF THE INVENTION

In accordance with the present invention, apparatus and methods to characterize and measure fruit pieces are provided. Fruit pieces or a food product containing fruit pieces, for example, a filling with fruit pieces in a matrix of sugar and/or starch, is spread on a sample tray and placed above the translucent screen of a light box. Lamps illuminate the fruit on the viewing cell from above or below or both. A camera captures the image and the resulting image is analyzed in a computer using imaging software. The results can be used for product quality assurance and to determine the effect of the processing on the fruit degradation.

A more detailed explanation of the invention is provided in the following description and claims.

BRIEF DESCRIPTION OF THE DRAWING

FIGS. 1–4 comprise drawings of apparatus useful in the practice of the present invention.

FIG. 1 is a perspective view of a light box, camera mount and camera;

FIG. 2 is a cabinet;

FIG. 3 is a sample tray; and

DETAILED DESCRIPTION OF THE ILLUSTRATIVE EMBODIMENT

An illustrative embodiment of apparatus useful in the present invention will be described herein with reference to the accompanying drawings. The described apparatus is only illustrative of a presently preferred form of useful apparatus and is not meant to limit or restrict the scope of the invention.

Figure 1:
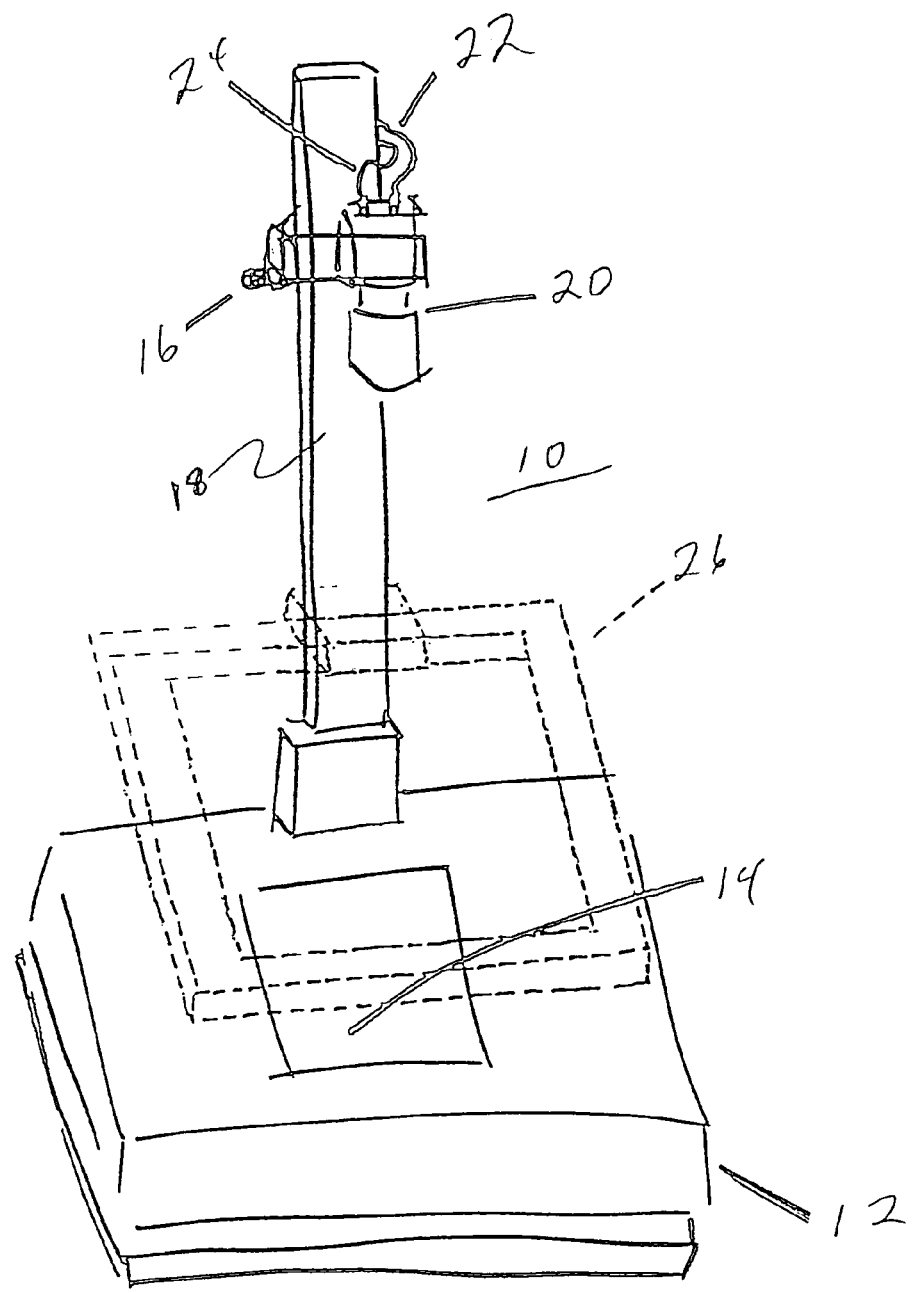

Referring to FIG. 1, imaging apparatus 10 is shown. The imaging apparatus 10 includes a light box 12 with a light-transmitting, translucent screen 14. A camera mount 16 is mounted on a vertical arm 18. A camera 20 is placed in the camera mount 16 and connected to power input line 22 and output line 24. The camera mount 16 preferably will allow the position of the camera to be adjusted vertically and in two directions horizontally. The vertical arm 18 preferably includes a numbered scale.

The camera 20 could be an analog or digital, video or still camera. Suitable cameras are widely available. The camera can be connected by appropriate wiring, such as output line 24, and hardware such as a frame grabber card installed in a computer which feeds an image to the computer. The computer analyzes the image using an appropriate software program.

Generally, in order for a software program to find particles in an image, the user must define maximum and minimum grayscale and size parameters. The software program should be capable of analyzing the image for "particles" or "blobs" based on the user-defined grayscale values and size parameters and preferably can report on individual particles or do statistical analysis on all particles found in an image. The software program should also have the capability of altering an image by methods such as filtering "noise," adjusting contrast and brightness levels, or performing special algorithms on the pixels in the image. All computer hardware and software functions can be recorded and saved as a script or macro. The user would then need only have to capture the image, run a recorded macro, and he would then be presented with the results that were pre-selected to be reported.

Although cameras and computer hardware and software useful in the practice of this invention are widely available from a large number of manufacturers and suppliers, an appropriate camera is a Sony CCD video camera Model XC75. The image can be fed to a frame grabber computer card in a standard personal computer with monitor. Software which can be used to analyze the image is Global Image 3.0 from Data Translation Inc.

Optionally, as shown in phantom lines in FIG. 1, the imaging apparatus includes an incident light source in a cut-out rectangular frame 26. It is preferably mounted so as to be vertically-adjustable.

The light box 12 can include a number of different intensity light sources and the intensity should be adjustable such as with dimmer switches. Preferably, the light source may be controlled from fully off to the full power of the light source.

In the presently preferred embodiment, inside the light box 12 are four 12 inch long/8 watt fluorescent bulbs and one 8 inch diameter/22 watt circular fluorescent bulb. The vertically-adjustable incident light source consists of two 12 inch long/8 watt fluorescent bulbs. There are three control switches: one for the 12 inch long lower lights; one for the 8 inch circular lower light and one for the 12 inch long incident lights.

Figure 2:
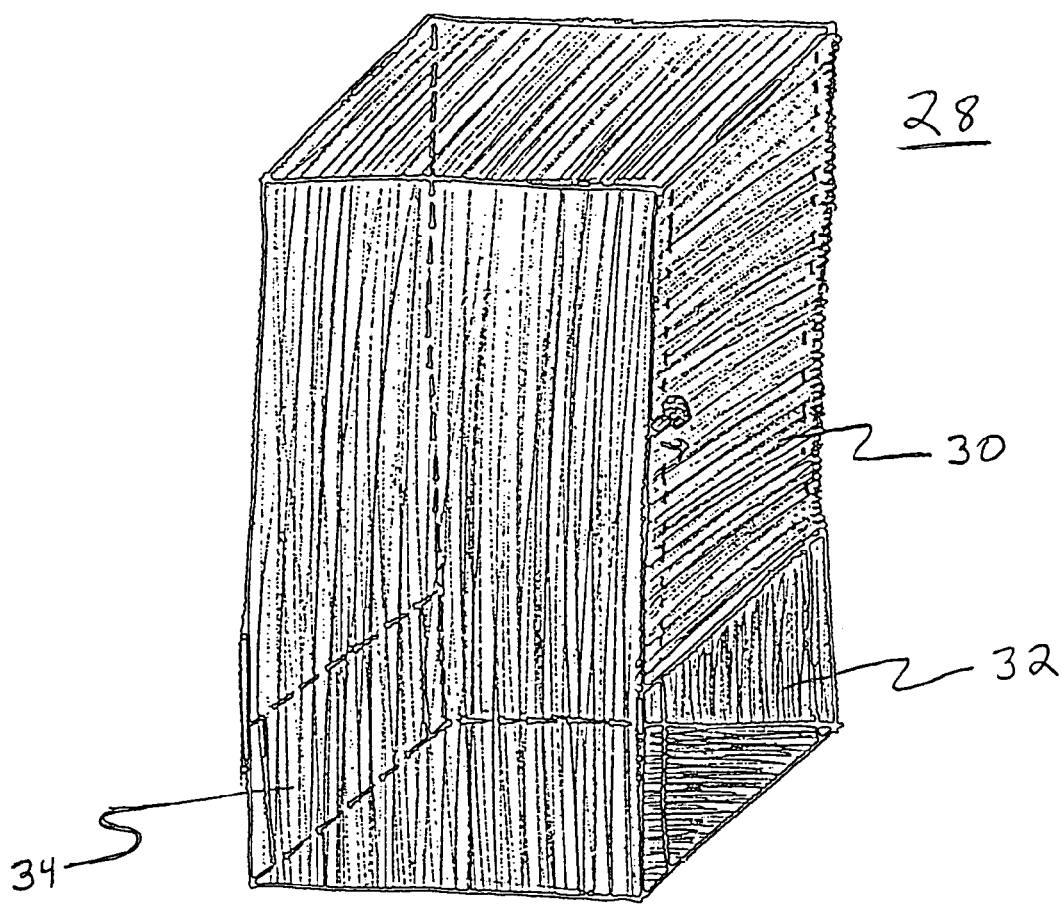

FIG. 2 illustrates a substantially opaque cabinet 28 sized and shaped so that the apparatus shown in the other figures may be placed inside and still be accessed and used. The cabinet 28 is used to eliminate or filter ambient light. Ambient light reflected off of the fruit particles or the fruit product matrix could interfere with the capture of the image. In addition, to prevent reflection, the inside of the cabinet 28 is painted with flat black paint.

The cabinet 28 includes a hinged door 30 attached to the front. The front door 30 covers the upper and middle portions of the front of the cabinet 28. An opening 32 is provided in the lower portion of the front of the cabinet 28 to provide for placement and removal of a sample tray (see FIG. 3) over the translucent screen 14 of the light box 12 inside the cabinet 28. The front door 30 and opening 32 are sized so that the door extends to a height just slightly above the combined height of the light box, light box cover (See FIG. 4A and FIG. 4B) sample tray inside the cabinet.

The cabinet 28 will also have openings as may be convenient or necessary to permit access to, for example, controls and switches for the lights and to accommodate such things as electrical power and signal cords. The embodiment of the cabinet 28 shown in FIG. 2 includes for these purposes an opening 34 in its lower rear portion.

Figure 3:
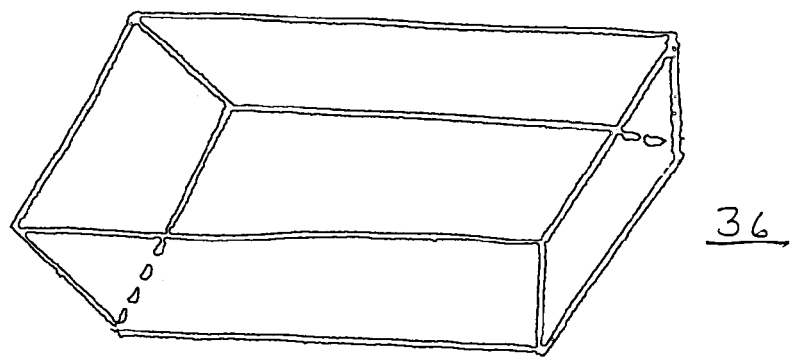

FIG. 3 illustrates an embodiment of a sample tray 36. The sample tray 36 includes a clear, light-transmitting bottom. The bottom can be made out of, for example, clear glass or plastic. Although not necessary, the side walls may also be made of clear, light-transmitting material.

Preferably, as shown in FIG. 3, one end wall of the sample tray 36 is angled. The angled end wall acts as a guide to permit easier and quicker placement of the sample tray 36 inside the cabinet 28 on the light box 12.

Figure 4A:
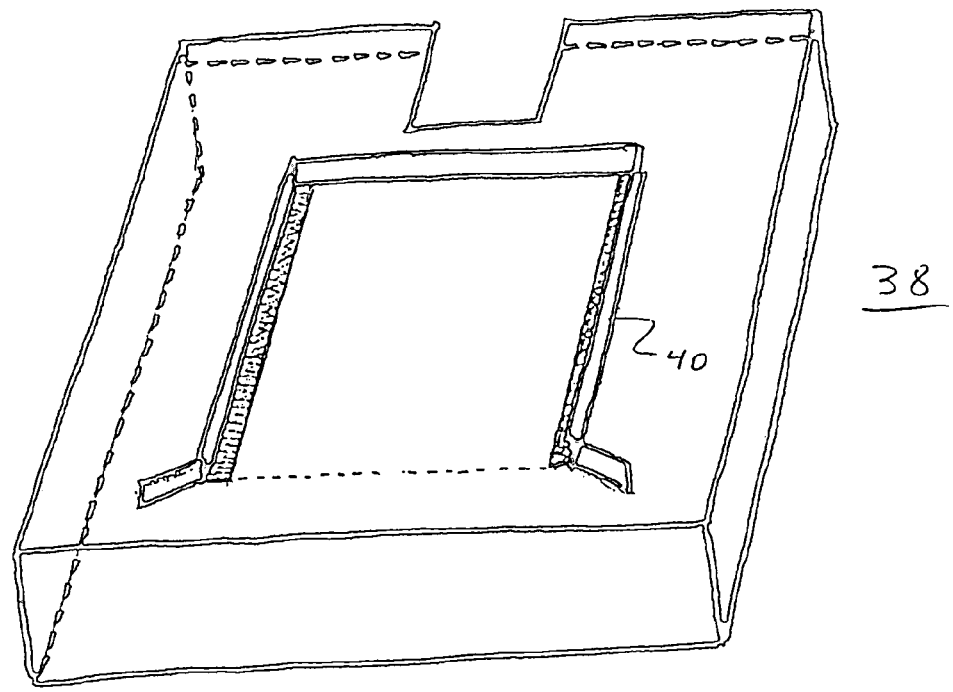
FIG. 4A is a front perspective drawing of a light box cover with a sample tray guide frame and FIG. 4B is a rear perspective drawing of the same apparatus.
Figure 4B:
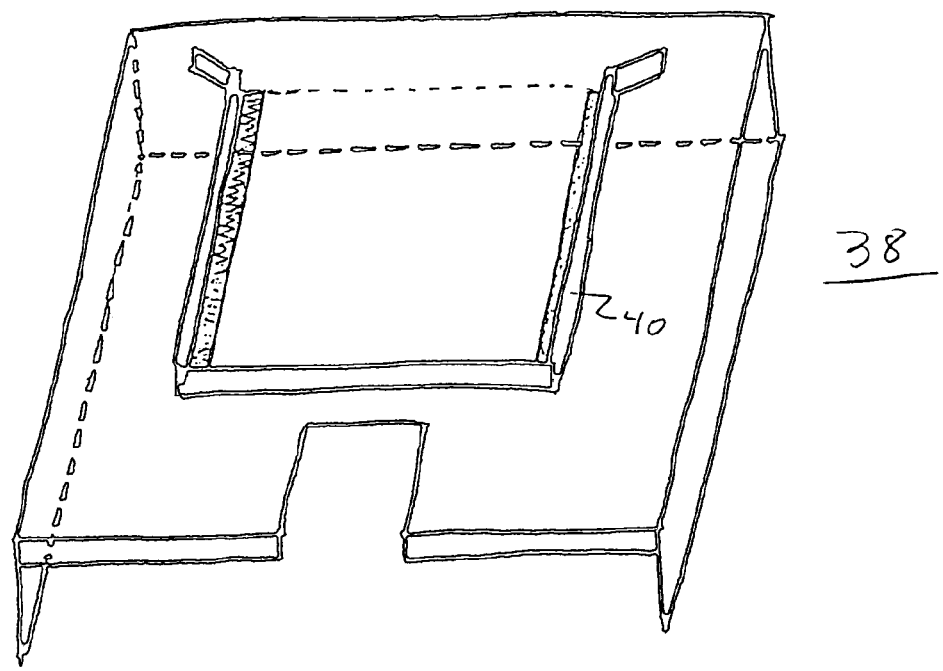

FIG. 4A and FIG. 4B provides two views of an optional light box cover 38 which includes a sample tray guide frame 40. The light box cover 38 is used to protect the light box 12 and keeps the light box 12 from getting dirty or soiled with spilled food and the like. The light box cover 38 is sized and shaped to fit over the light box 12 and within the cabinet 28. The light box cover 38 will also include (like the cabinet 28) openings to permit access to controls and to accommodate electrical cords. In the preferred embodiment and as best shown in FIG. 4B, an opening is provided in the rear of the light box cover 38 to correspond to the opening 34 in the cabinet 28 because it is believed to be less likely that food product will be spilled on the rear.

The light box cover 38 is preferably made of an easily-cleaned, scratch-resistant, light-transmitting material such as a hard plastic or glass. It is important, of course, that the portion of the light box cover 38 designed to be placed over the translucent screen 14 of the light box 12 be light-transmitting.

A sample tray guide frame 40 is provided on the top of the light box cover. It functions to make sure the sample tray 36 is properly placed above the translucent surface 14 of the light box 12. The sample tray guide frame 40 is three-sided with short, angled extensions on its open front end. These extensions help to guide the sample tray 36 into proper position more quickly and accurately.

An illustrative embodiment of a method useful in the practice of the present invention will now be described for use in connection with and in reference to the illustrated apparatus. As with the illustrated apparatus, the described method is only illustrative of a presently preferred method and is not meant to be limiting or restrict the scope of the invention.

The fruit particles analyzed can be fruit pieces and food products containing fruit pieces that are used in fruit fillings, toppings, or dairy or cooked food products. The fruit particles may be fresh, frozen or cooked and may be of any size or shape compatible with the apparatus used.

The measurements as described herein are usually done on a sample of a larger batch of material containing representative sample of the materials to be tested and/or to test more than a single sample.

A sample consisting of fruit particles or fruit particles in a matrix is spread evenly inside the sample tray 36 with a spatula or, if the sample is not very viscous, by gently shaking the tray with a circular motion. The sample size should be chosen so that it is possible to adjust the lights so that the fruit particles in the sample appear as darker areas against a lighter background. In order to fairly and accurately compare one sample to other samples and controls or standards, for each type of food product, a uniform sample size should be used, and the sample should be measured in, at least approximately the same conditions, such as the same step in the manufacturing process and the same temperature and concentration.

The sample tray 36 containing the sample is placed above the translucent screen 14 of the light box 12. Preferably, the apparatus is positioned within the cabinet 28 with the light box cover 38 in place. The light settings and camera height, position, focus and aperture are adjusted so that an appropriate image is produced. It has been found that it is preferable not to use the lights in the optional incident light source 26 for fruit products in a reflective matrix. The reflected glare interferes with and prevents obtaining a good image. At least substantially the same set up and settings should be used for like samples so that again the samples may be fairly and accurately compared.

An image is captured by the camera and sent to the computer for analysis pursuant to the software program and the user-defined values, parameters and criteria. The information that is reported and the form of the report (for example, printed or on-screen, table or graph) can be selected by the user in accordance with the capabilities of the system's hardware and software.

For fruit particle measurement, the report can include the area of the image containing particles within a particle size Range of Interest ("ROI"), the percentage of particles within the ROI, the percentage of fruit by area and the total area of the particles. With appropriate images and software, analysis of other characteristics such as shape of the fruit pieces and major and minor axis comparison of the fruit pieces may be obtained. This information can be used as process control or quality assurance standards and for determining compliance with product specifications.

Although an illustrative embodiment of the invention has been shown and described, it is to be understood that various modifications and substitutions may be made by those skilled in the art without departing from the novel spirit and scope of the present invention.

What is claimed is:

1. Apparatus for the measurement of fruit particles in a matrix without removing the fruit particles from this matrix, comprising:
    a substantially opaque cabinet;
    a sample tray adapted to receive a fruit matrix of fruit particles which are within a matrix selected from the group consisting of a sugar matrix, a starch matrix or a sugar and starch matrix, said fruit matrix being of the kind used in fruit fillings, toppings, dairy products or cooked food products;
    a camera in the upper portion of said cabinet for taking an image of the fruit particles while they remain within the fruit matrix;
    a light source in said cabinet; and
    a computer with image analyzing software which analyzes said image of the fruit particles in order to measure the fruit particles without having removed them from the fruit matrix.

2. The apparatus of claim 1 wherein said light source comprises a light box in the lower portion of said cabinet.

3. The apparatus of claim 1 wherein said light source comprises an incident light source within said cabinet.

4. The apparatus of claim 1 wherein the light source comprises switches for adjusting the intensity of the light.

5. The apparatus of claim 1 wherein the light source comprises multiple, independently-adjustable, light-producing sources.

6. The apparatus of claim 1 wherein the inside of the cabinet is non-reflecting.

7. The apparatus of claim 1 wherein said sample tray comprises a light-transmitting bottom.

8. The apparatus of claim 2 wherein said apparatus further comprises a light box cover.

9. The apparatus of claim 8 wherein said apparatus further comprises a sample tray guide.

10. Apparatus for the measurement of fruit particles in a matrix without removing the fruit particles from this matrix, comprising:
    a substantially opaque cabinet with a non-reflecting inside surface;
    a sample tray with a light-transmitting bottom, said sample tray adapted to receive a fruit matrix of fruit particles which are within a matrix selected from the group consisting of a sugar matrix, a starch matrix or a sugar and starch matrix, said fruit matrix being of the kind used in fruit fillings, toppings, dairy products or cooked food products;
    a camera in the upper portion of said cabinet for taking an image of the fruit particles while they remain within the fruit matrix;
    a light box with light intensity adjusting switches;
    an incident light source; and
    a computer with image analyzing software which analyzes said image of the fruit particles in order to measure the fruit particles without having removed them from the fruit matrix.

11. A process for the measurement of fruit particles in a matrix without removing the fruit particles from this matrix comprising:
    placing in a sample tray a fruit matrix, said fruit matrix being fruit particles which are within a matrix selected from the group consisting of a sugar matrix, a starch matrix or a sugar and starch matrix, said fruit matrix being of the kind used in fruit fillings, toppings, dairy products or cooked food products;
    illuminating said fruit matrix so that an image may be obtained in which the fruit particles are distinguishable from the background;
    capturing a computer-readable image of at least a portion of said illuminated fruit matrix; and
    using a computer and an image analyzing software program to analyze said image and obtain information concerning said fruit particles without removing the fruit particles from the fruit matrix.

12. The process of claim 11 wherein said illuminating of the fruit particles in a matrix is from below the sample tray, and said illuminating is therethrough in obtaining said image.

13. The process of claim 12 wherein said illuminating is from below only.

14. The process of claim 11 wherein the placing occurs spatially between the illuminating location and the capturing location.

15. The process of claim 14 wherein the illuminating has no source which is between the sample tray and the capturing location.

16. The apparatus of claim 1 wherein the light source illuminates the sample tray from below.

17. The apparatus of claim 16 wherein said sample tray is illuminated only from below by said light source.

18. The apparatus of claim 1 wherein said sample tray is between said light source and said camera.

19. The apparatus of claim 18 wherein said light source has no source of light which is between the sample tray and the camera.

* * * * *

UNITED STATES PATENT AND TRADEMARK OFFICE
CERTIFICATE OF CORRECTION

PATENT NO. : 7,212,654 B2  Page 1 of 1
APPLICATION NO. : 08/879322
DATED : May 1, 2007
INVENTOR(S) : Hodgson et al.

It is certified that error appears in the above-identified patent and that said Letters Patent is hereby corrected as shown below:

Col. 3, line 66: Please delete "48" and insert -- 4B --.

Signed and Sealed this

Nineteenth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,212,654 B2 Page 1 of 1
APPLICATION NO. : 08/879322
DATED : May 1, 2007
INVENTOR(S) : Hodgson et al.

It is certified that error appears in the above-identified patent and that said Letters Patent is hereby corrected as shown below:

Col. 3, line 66: Please delete "48" and insert -- 4B --.

Signed and Sealed this

Fourteenth Day of August, 2007

JON W. DUDAS
*Director of the United States Patent and Trademark Office*